United States Patent
Lloyd et al.

(10) Patent No.: US 11,243,773 B1
(45) Date of Patent: Feb. 8, 2022

(54) AREA AND POWER EFFICIENT MECHANISM TO WAKEUP STORE-DEPENDENT LOADS ACCORDING TO STORE DRAIN MERGES

(71) Applicant: International Business Machines Corporation, Armonk, NY (US)

(72) Inventors: Bryan Lloyd, Austin, TX (US); David Campbell, Austin, TX (US); Brian Chen, Austin, TX (US); Robert A. Cordes, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/120,371

(22) Filed: Dec. 14, 2020

(51) Int. Cl.
*G06F 9/38* (2018.01)
(52) U.S. Cl.
CPC ................... *G06F 9/3836* (2013.01)
(58) Field of Classification Search
CPC .................................................. G06F 9/3836
See application file for complete search history.

(56) References Cited

U.S. PATENT DOCUMENTS

| | | | | |
|---|---|---|---|---|
| 6,226,707 | B1 * | 5/2001 | Mattela ............... | G06F 12/0886 711/3 |
| 9,448,936 | B2 | 9/2016 | Goel et al. | |
| 9,552,206 | B2 | 1/2017 | Johnson et al. | |
| 10,380,063 | B2 | 8/2019 | Tang et al. | |
| 11,175,917 | B1 * | 11/2021 | Agarwal ............... | G06F 9/4881 |
| 2008/0086594 | A1 * | 4/2008 | Chang .................. | G06F 9/3826 711/118 |
| 2010/0325395 | A1 * | 12/2010 | Burger ................. | G06F 9/3838 712/216 |
| 2016/0092225 | A1 * | 3/2016 | Collura ................ | G06F 9/3857 712/228 |
| 2018/0081686 | A1 * | 3/2018 | Ho ..................... | G06F 9/30043 |

OTHER PUBLICATIONS

Anonymous "Method for wake-up and schedule instructions for use with a register file cache" ip.com, Jun. 29, 2006, IPCOM000137912D (6 pages).
Anonymous "Power gating technique for Memory Arrays" ip.com, Jan. 28, 2009, IPCOM000178886D (7 pages).

(Continued)

*Primary Examiner* — Michael J Metzger
(74) *Attorney, Agent, or Firm* — Cantor Colburn LLP; Gail Zarick

(57) ABSTRACT

A computer system, includes a store queue that holds store entries and a load queue that holds load entries sleeping on a store entry. A processor detects a store drain merge operation call and generates a pair of store tags comprising a first store tag corresponding to a first store entry to be drained and a second store tag corresponding to a second store entry to be drained. The processor determines the pair of store tags an even-type store tag or an odd-type store tag. The processor disables the odd store tag included in the even-type store tag pair when detecting the even-type store tag pair, and wakes up a first load entry dependent on the even store tag and a second load entry dependent on the odd store tag based on the even store tag included in the even-type store tag pair while the odd store tag is disabled.

20 Claims, 10 Drawing Sheets

(56) References Cited

OTHER PUBLICATIONS

Castro et al. "Load-store queue management: an energy-efficient design based on a state-filtering mechanism" 2005 International Conference on Computer Design. IEEE, (Oct. 2005) pp. 617-624.
Hayenga "Power-Efficient Loop Execution Techniques" (Doctoral dissertation, University of Wisconsin—Madison) 2013 (181 pages).
Rault "Energy-efficiency in wireless sensor networks" (Doctoral dissertation)2015 (180 pages).
Singhania et al. "Computation of Dynamic Current Drain in Presence of Interconnect Capacitive Coupling: a Method" ip.com, Jun. 10, 2005, IPCOM000125665D (7 pages).

* cited by examiner

AREA AND POWER EFFICIENT MECHANISM TO WAKEUP STORE-DEPENDENT LOADS ACCORDING TO STORE DRAIN MERGES

BACKGROUND

Embodiments of the present invention relate in general to computer processing systems, and more specifically to instruction sequencing in an out-of-order processor.

Microprocessors implemented in modern computer processing systems often execute loads and stores out-of-order to avoid being idle while waiting for the preceding instruction to complete. In the meantime, the processor can process the next instruction(s) that are able to run immediately and independently. When data loads and data stores execute out-of-order, dedicated buffers are implemented to track data dependencies between the loads and stores to ensure that the loads and stores observed the data in the correct program order. In certain architectures, data stores will not write to the cache until the stores have completed in their out-of-order processing, and as a result various data loads that are younger in the program sequence could require the result of the older stores' data. However, since the data has not yet written to the cache, precise data load handling must be implemented to ensure the load does not read the data from the cache.

SUMMARY

According to a non-limiting embodiment, a computer-implemented method is provided for executing a store drain merge operation to wakeup load entries sleeping on dependent store entries. The method comprises detecting, by a processor, a call to perform the store drain merge operation, and generating a pair of store tags comprising a first store tag corresponding to a first store entry to be drained and a second store tag corresponding to a second store entry to be drained. The method further comprises determining the pair of store tags is one of an even-type store tag and an odd-type store tag. The even-type store tag pair includes the first store tag as an even store tag and the second store tag as an odd store tag, while the odd-type store tag includes the first store tag as an odd store tag and the second store tag as an even store tag. The method further includes in response to determining the even-type store tag pair, disabling the odd store tag included in the even-type store tag pair, and waking up a first load entry dependent on the even store tag and a second load entry dependent on the odd store tag based on the even store tag included in the even-type store tag pair while the odd store tag is disabled.

According to another non-limiting embodiment, a computer system is configured to execute a store drain merge operation to wakeup load entries sleeping on dependent store entries. The computer system comprises a store queue unit configured to hold at least one store entry to be completed and a load queue unit configured to hold at least one load entry sleeping on a store entry included in the store queue unit. A processor is configured to detect a call to perform a store drain merge operation and to generate a pair of store tags comprising a first store tag corresponding to a first store entry to be drained from the store queue unit and a second store tag corresponding to a second store entry to be drained from the store queue unit. The processor determines the pair of store tags is one of an even-type store tag and an odd-type store tag. The even-type store tag pair includes the first store tag as an even store tag and the second store tag as an odd store tag, while the odd-type store tag includes the first store tag as an odd store tag and the second store tag as an even store tag. The processor disables the odd store tag included in the even-type store tag pair in response to determining the even-type store tag pair, and wakes up a first load entry dependent on the even store tag and a second load entry dependent on the odd store tag based on the even store tag included in the even-type store tag pair while the odd store tag is disabled.

According to yet another non-limiting embodiment, a computer program product is provided to control a computer system to execute a store drain merge operation to wakeup load entries sleeping on dependent store entries. The computer program product comprises a computer readable storage medium having program instructions embodied therewith. The program instructions are executable by an electronic computer processor to control the processor to perform operations comprising detecting, by the processor, a call to perform the store drain merge operation, and generating a pair of store tags comprising a first store tag corresponding to a first store entry to be drained and a second store tag corresponding to a second store entry to be drained. The method further comprises determining the pair of store tags is one of an even-type store tag and an odd-type store tag. The even-type store tag pair includes the first store tag as an even store tag and the second store tag as an odd store tag, while the odd-type store tag includes the first store tag as an odd store tag and the second store tag as an even store tag. The method further includes in response to determining the even-type store tag pair, disabling the odd store tag included in the even-type store tag pair, and waking up a first load entry dependent on the even store tag and a second load entry dependent on the odd store tag based on the even store tag included in the even-type store tag pair while the odd store tag is disabled.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
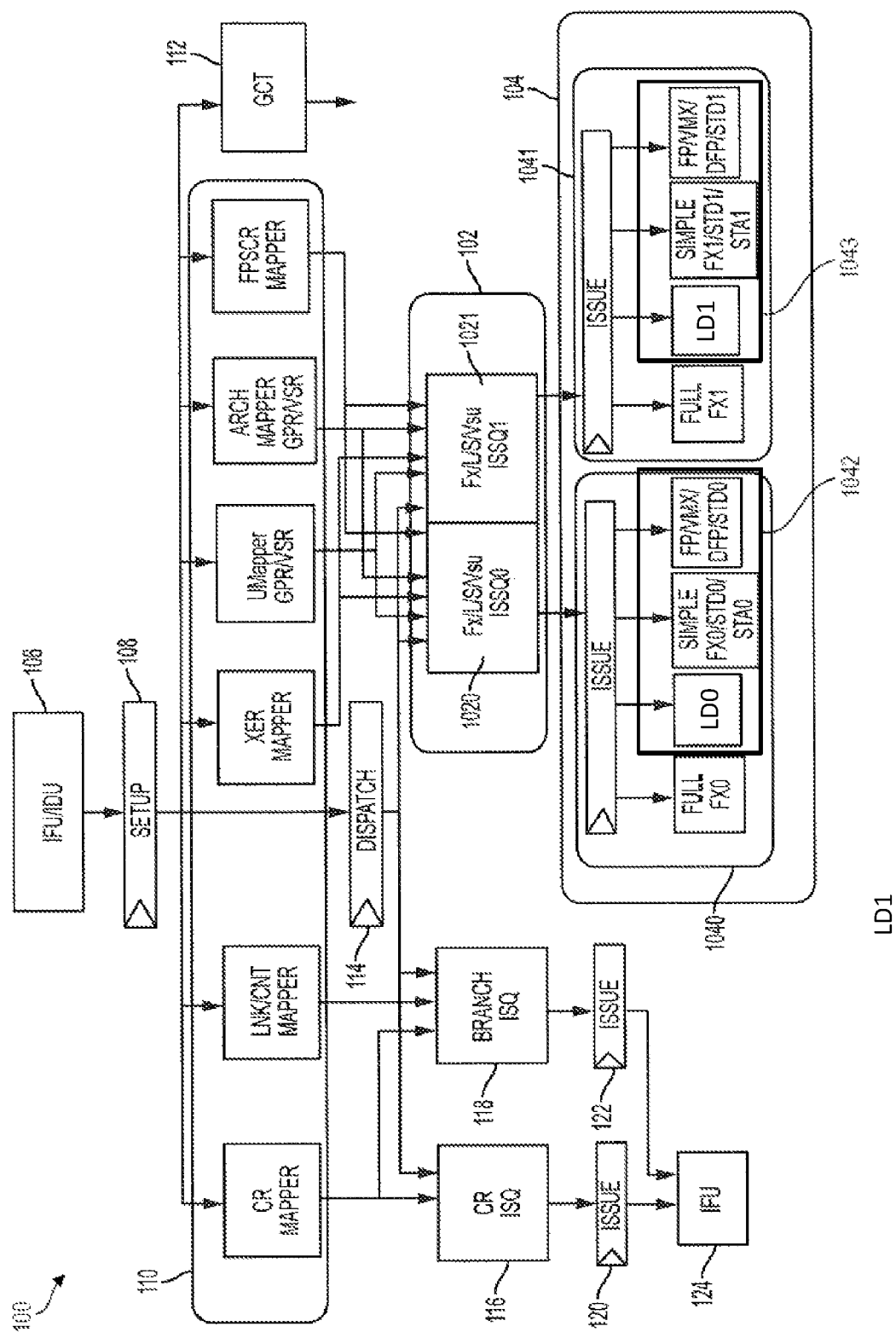
FIG. 1 is a block diagram of an example computer system for use in conjunction with one or more non-limiting embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

As mentioned above, out-of-order execution uses precise data load handling to ensure the load does not read the data from the cache prior to the data actually being written to the cache. To optimize performance, a "hibernation" process can be employed where the load will read data from a buffer (sometimes referred to as a "store queue") that holds pending store data. If there is address overlap between the load and store, then the store can forward its data to the load. However, there are certain scenarios where the store cannot always forward its data to the load. When this happens, then the load must "hibernate" or temporarily be set to "sleep" in a load queue until the store has completed and written to the cache so that the load can read the store's data from the cache. This is generally achieved by assigning each load in the processer to a store's "tag" (i.e., "stag"). A given stag is defined by a number of bits (e.g., 7 bits) and serves as an identifier that is unique to each store in the processor.

Stores will always write to the cache in program order. When the store writes to the cache, it will broadcast its store tag to the load queue structure containing one or more loads that are "sleeping" on their associated store(s). The load queue structure performs a content addressable memory compare to search all loads that are waiting on their associated store. When there is a compare match, the load queue commands the corresponding loads to "wake up" and access the cache to return data.

In general, the hibernation process described above is expensive to implement in the hardware and can also consume an excessive amount of power. As an alternative solution, some computing systems have managed to "merge" data stores when they write to the cache by grouping stores that are adjacent in memory to write to the cache in the same processor cycle. These groupings will always be done in pairs of two, if it is achievable in a single given processor cycle. This allows data stores to achieve double the write bandwidth into the cache, thereby improving computer processing performance. However, when two stores write to the cache at the same time, each store has its own unique identification store tag ("stag") and moreover multiple loads could be sleeping on each store individually. To manage the second store tag associated with the second store included in the pair, a second dedicated compare port may be added to the large load queue structure that can send both store tags at once to be compared. However, this solution adds significant costs to the computer processing system from a hardware area and power perspective.

According to one or more non-limiting embodiments, a computer processing system is provided that implements a store drain merge operation capable of waking up loads based on their dependent stores, without adding a second compare port. More specifically, a limited number of store tags are sequentially allocated in a circular order (sometimes referred to as a "round robin order") that matches the program order of the stores. For example, store tag 0 will be assigned to a first store observed by the program, store tag 1 will be observed by the next store, and so on. When the store tags run out (i.e. the number of assigned store tags has reached the set limit), the processor will stall until more store tags become available. When stores reach the limit of their "tag space", the younger store in the program sequence will simply wrap around again to store tag 0 if it is available. The processor disambiguates the age of the stores by keeping an "oldest store tag" pointer that knows if this wrap-around case has occurred. With this in mind, the computer processing system according to one or more non-limiting embodiments of the invention avoids the need to implement a second compare port in the load queue structure by grouping the draining data stores as a pair of even and odd pairs in order to determine which loads to wake up from hibernation. An even store will be associated with an even store tag, while an odd store will be associated with an odd store tag. Since all stores drain in order, when the store associated with tag(n) drains, then it is guaranteed that the store associated with store tag(n+1) will drain next. When the computer processing system initiates a store drain merge, the compare of the least significant bit (LSB) is disabled, which essentially indicates that all loads waiting on store tag(n) and store tag(n+1) will wake up at the same time.

In some instances, the store drain merge may be initiated during a given cycle associated where the first store is and odd store and the second store is an even store. Accordingly, one or more non-limiting embodiments of the invention, the store drain merge described herein performs different operations based on whether the first store is an even store and the second store is an odd store, or whether the first store is an odd store and the second store is an even store.

For example, when a store drain merge for writing to the cache occurs on an odd store during a given cycle(n), then the double drain tag compare will be grouped by disabling the LSB compare for the next processor cycle(n+1), but only if there is an additional drain in that nest cycle(n+1). If there is no drain in that next cycle(n+1), then the store tag that drained in the previous cycle(n−1) will be added with a single store tag and will be woken up in next immediate cycle(n+1), thereby individually waking up an even store tag. If a double write continuously occurs on back to back boundaries that are associated with an odd store tag, then the processor will continue the delay for the next single cycle until it finds a "hole" or "catch up" event in the store write sequence to essentially "catch up." That is, the delayed wakeup (i.e., delaying the wakeup to the next cycle) can be continuously performed until a given cycle in the sequence does not observe a double store write, i.e, a store drain merge operation.

Turning now to FIG. 1, a block diagram of a processing system 100 that includes an instruction sequencing unit (ISU) of an out-of-order (OoO) processor wide vector execution in a single thread mode is generally shown according to one or more embodiments of the invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 is shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper GPR/VSR, ARCH Mapper GPR/VSR, and FPSCR mapper are input to issue queue 102. As shown in FIG. 1, issue queue 102 tracks issued floating point instructions (Fx), load instructions (L), store instructions (S), and vector-and-scalar unit (VSU) instructions. As shown in the embodiment of FIG. 1, issue queue 102 is broken up into two parts, ISQ0 1020 and ISQ1 1021, each portion holding forty-eight instructions.

When the processor is executing in ST mode, the issue queue 102 can be used as a single logical issue queue that contains both ISQ0 1020 and ISQ1 1021 to process all of the instructions (in this example all ninety-six instructions) of a single thread. When the processor is executing in MT mode, ISQ0 1020 can be used to process forty-eight instructions from a first thread and ISQ1 1021 is used to process forty-eight instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FP/VMX/DFP/STD0 form a load-store unit (LSU) 1042. Similarly, the LU1, the Simple FX1/STD1/STA1, and the FP/VMX/DFP/STD1 form a LSU 1043. Although the ISQ 104 is illustrated with split execution units 1040 and 1041, it should be appreciated that a single execution unit can be implemented without departing from the scope of the invention.

As shown in FIG. 1, when the processor is executing in ST mode, the first group of execution units 1040 execute instructions issued from ISQ0 1020 and the second group of execution units 1041 execute instructions issued from ISQ1 1021. In alternate embodiments when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
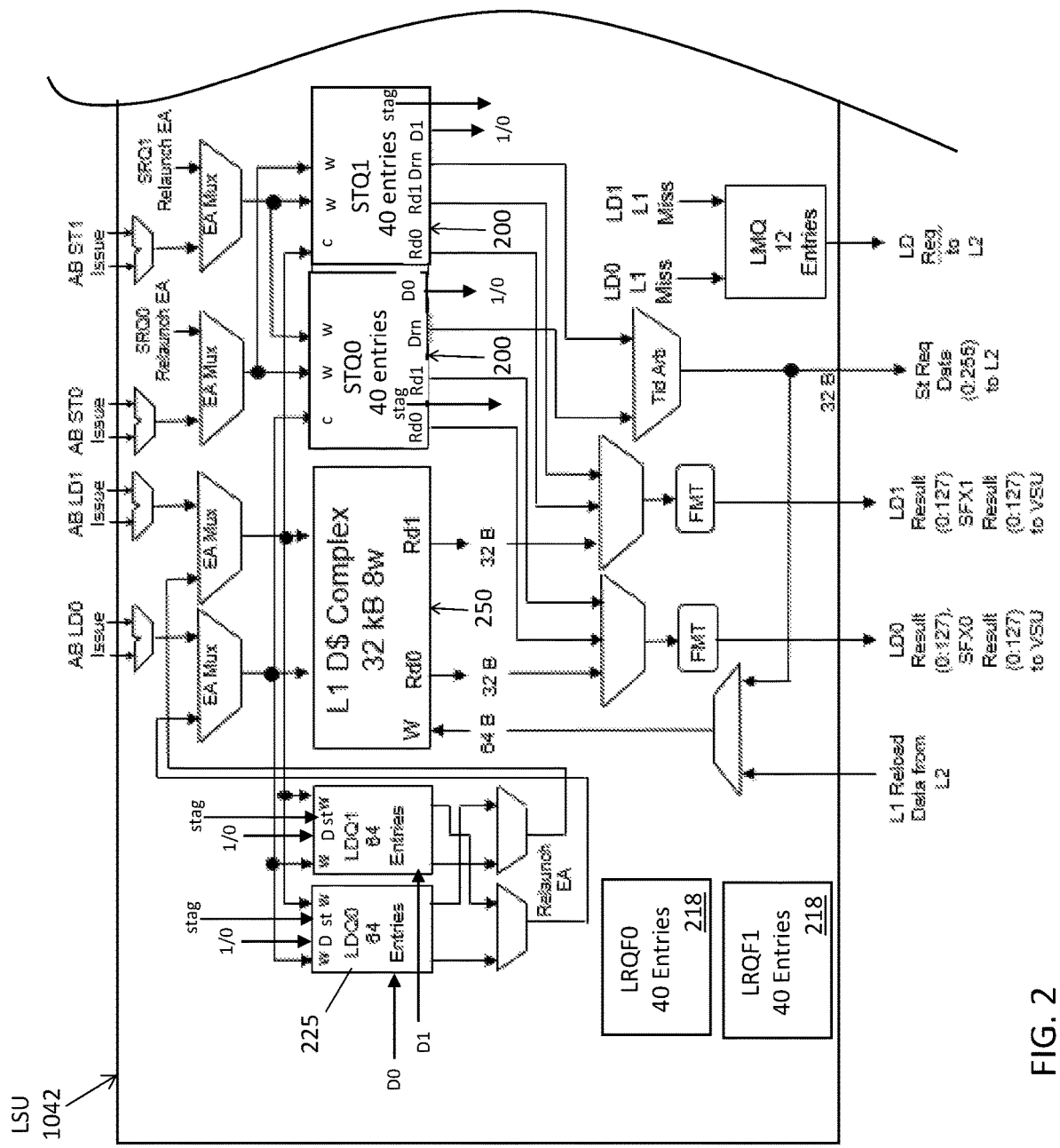
FIG. 2 depicts a block diagram of a load-store unit included in the computer processing system according to a non-limiting embodiment.

Turning to FIG. 2, an LSU 1042 included in the computer processing system 100 is illustrated according to a non-limiting embodiment. The LSU 1042 depicted facilitates execution of a store drain merge operation capable of waking up loads based on their dependent stores, without adding a second compare port. It should be noted, however, that the embodiments described herein are not limited to such an LSU. The LSU 1042 includes one or more one or more store queue units (STQ) 220 that hold store entries and one or more load queues units (LDQ) 225 that hold load entries. In the example embodiment of FIG. 2, the LSU 1042 includes two STQs 220 (STQ0 and STQ1) and two LDQs 225 (LDQ0 and LDQ1). More or less STQs 200 and/or LDQs 225 can be implemented in the LSU 1042. The STQs 200 and the LDQs 225 can also be designed and configured to have varying amounts of entries. In one or more non-limiting embodiments, for example, the LDQs 225 can have sixty-four (64) entries, while the STQs 200 can have forty (40) entries. It should be appreciated, however, that more or less load entries and/or store entries can be implemented.

The STQ entries and the LDQ entries are assigned (allocated) in program order typically at dispatch, e.g., by the dispatch unit, if the entries in the queues are available. STQ entries typically are freed up (deallocated) when the store instructions have executed and the stores have drained into the processor cache 250 (e.g., the L1 processor cache). LDQ entries typically are freed up (deallocated) when the loads have completed (retired) and have entirely executed within the processor core.

Figure 3:
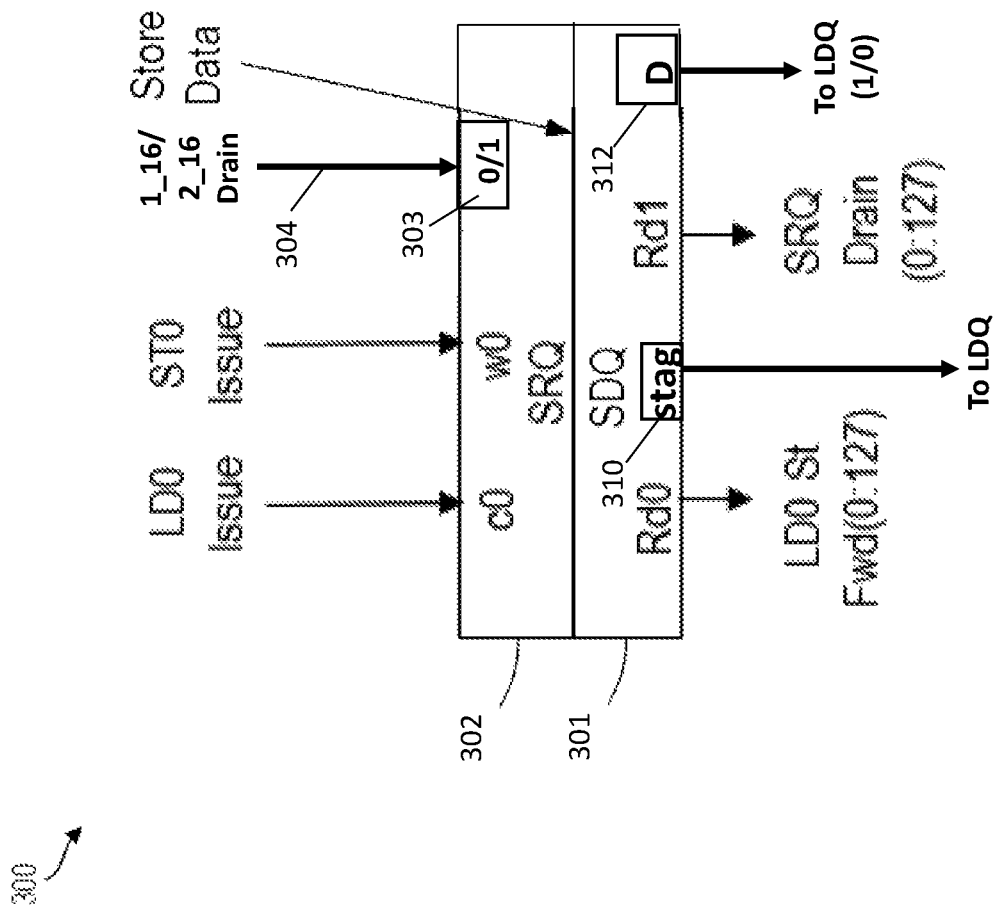
FIG. 3 depicts a store queue unit included in the load-store unit according to a non-limiting embodiment.

Turning now to FIG. 3, an example of a STQ 300 included in the LSU 1042 is illustrated according to a non-limiting embodiment. The STQ 300 can include a store data queue (SDQ) 301 and a store reorder queue (SRQ) 302. The SDQ 301, which in some embodiments can be integrated as part of the SRQ 302 itself to further save chip area, is configured to store translated address instructions or data associated with a given store queue entry.

The SRQ 302 can store the control bits for a store entry in the SDQ 301. The SRQ 302 also can keep track of store instructions that have been executed, determines store instructions that are next to complete, and determines when the data is available in the SDQs 301. In one or more non-limiting embodiments, the SRQs 302 are circular in order entry allocation, circular in order entry drain, and circular in order entry deallocation.

SRQ entries are allocated at dispatch where the dispatched store tags (stags) are filled into the correct row. Each stag is defined by a set number of bits and is an index to an SRQ entry. In one or more non-limiting embodiments, each stag is defined by seven (7) bits. It should be appreciated, however, that the stag may include more or less bits without departing from the scope of the invention. Further, SRQ entries are deallocated on store drain. In one or more examples, the stag arrays hold "overflow" dispatches. For example, information is written into the stag array at dispatch if the row in the SRQ that is desired, indicates SRQ entry "x" is still in use. When, the SRQ entry "x" is deallocated, its corresponding row in the SRQ overflow stag structure is read out and copied into the main SRQ stag array structure (i.e., a read of the overflow itag structure is gated depending on whether there are any valid entries in the overflow stag array for a given thread/region). The SRQ 302 sends the stag to the issue queue ISQ 0/1 when a store drains and deallocates.

Figure 4:
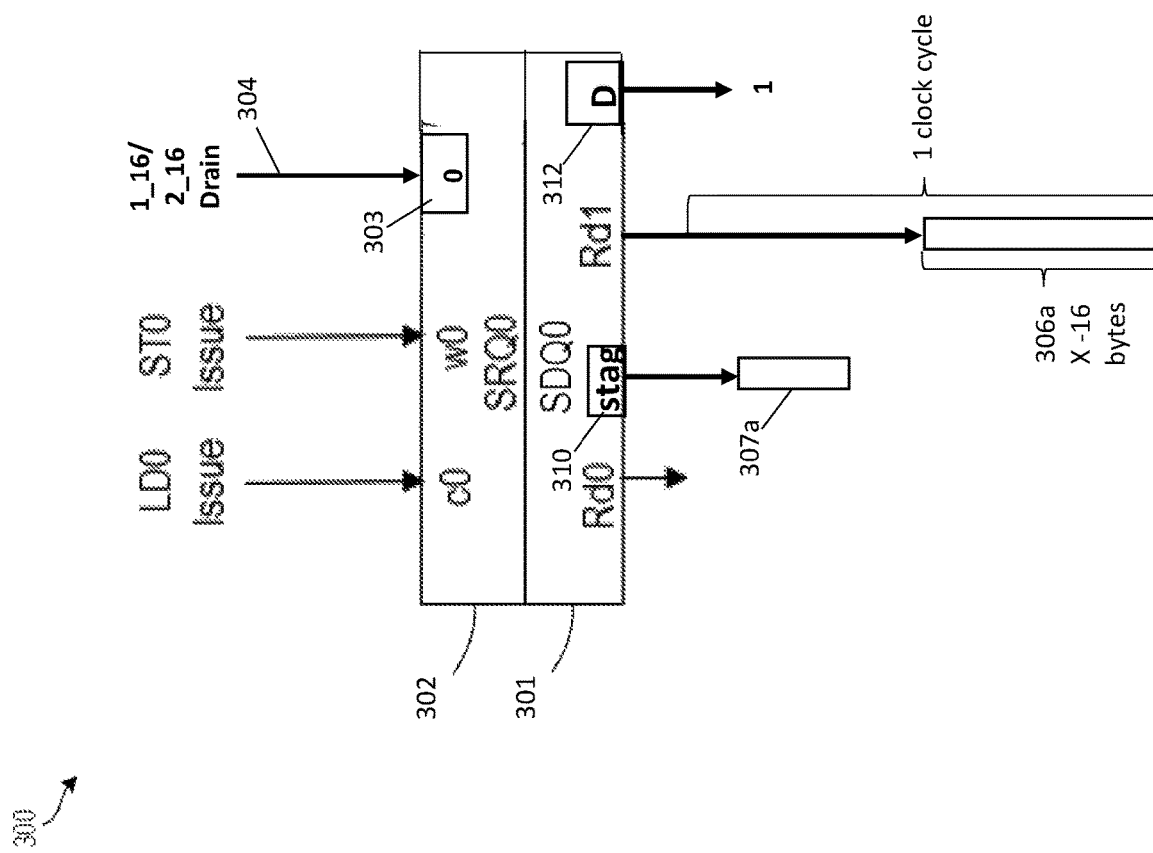
FIG. 4 depicts the store queue unit operating in a first mode to read out a single 16-byte store queue entry according to a non-limiting embodiment.
Figure 5:
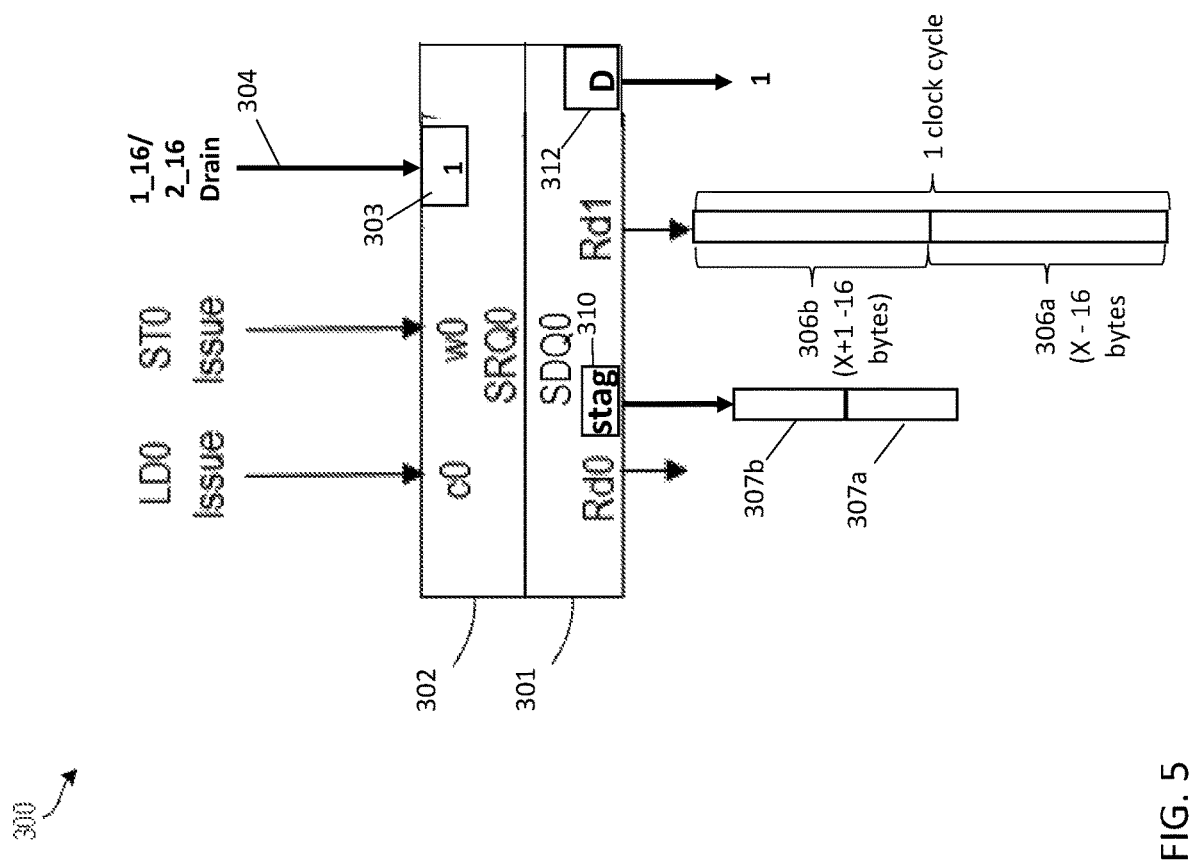
FIG. 5 depicts the store queue unit operating in a second mode to read out a pair of 16-byte store queue entries according to a non-limiting embodiment.

With continued reference to FIG. 3, along with FIGS. 4 and 5, the STQ 300 includes a store drain merge control input 303, a stag output 310, and a drain completion output 312. The store drain merge control input 303 is configured to receive a store drain merge control signal 304, which invokes either a first mode or a second mode of the STQ 300. The first mode reads out a single 16-byte store queue entry, while the second mode reads out a pair of 16-byte store queue entries. The stag output 310 outputs to the LDQ 225 either a single stag corresponding to a single store entry read out from the STQ 300 in response to invoking the first mode, or a pair of stags indicative of a pair of adjacent store entries in response to invoking the second mode. The pair of stags can be defined as either an even-type store tag pair where the first store tag is an even store tag and the second store tag is an odd store tag, or an odd-type store tag where the first store tag is an odd store tag and the second store tag is an even store tag. The drain completion output 312 outputs to the LDQ 225 a drain completion signal (D) indicating completion of a single drain when operating in the first mode, or completion of the pair of drains when operating in the second mode.

FIG. 4, for example, depicts the STQ 300 operating in the first mode to read out a single 16-byte store queue entry according to a non-limiting embodiment. In response to the system 100 determining that no store entries to be drained have adjacent addresses, the computing system 100 generates a logic 0 control signal 304 (e.g., a 0 bit) that is applied to the store drain merge control input 303. The logic 0 invokes the first mode, which causes the STQ 300 to read out a single 16-byte store queue entry 306a during a single clock cycle and output a single stag 307a that is delivered to the LDQ 225. Once the store drain entry 306a completes, the SRQ 300 outputs the drain complete signal (D) to the LDQ 225, which wakes up the sleeping loads in the LDQ 225. The LDQ 225 matches the stag 307a of the completed store entry 306a with one or more loads that were previously waiting on the store entry to complete, and executes each matching load entry to read corresponding data out from the cache 250 (e.g., L1 250).

Turning to FIG. 5, the STQ 300 is depicted operating in a second mode to read out a pair of 1-byte store queue entries according to a non-limiting embodiment. In response to the system 100 determining that one or more store entries to be drained have adjacent addresses, the computing system 100 generates a logic 1 control signal 304 (e.g., a 1 bit) that is applied to the store drain merge control input 303. The logic 1 invokes the second mode or a "store drain merge" operation, which causes the STQ 300 to read out a pair of 16-byte store queue entries 306a and 306b during a single clock cycle. In this mode, the STQ 300 also outputs to the LDQ 225 a pair of stags 307a and 307b corresponding to the two adjacent store entry drains 306a and 306b. Once the two store drain entries 306a and 306b complete, the SRQ 300 outputs the drain complete signal (D) to the LDQ 225, which wakes up the sleeping loads in the LDQ 225. Accordingly, the LDQ 225 matches the stag of the completed store entry with one or more woken loads that were previously waiting on the store entry to complete, and writes each matching load entry to cache 250 (e.g., L1 250).

As mentioned above, the LDQ receives a pair of stags corresponding to the pair of store drain entries. In instances where the pair of stags correspond to the pair of store drain entries having direct adjacent address (i.e., where the first store entry is an address and the second store entry is an odd address), the least significant bit (LSB) of the stags have a difference of 1. For example, an even stag may be associated with a first store entry and an odd stag having a difference in the LSB of "1" may be associated with a second store entry having a directly adjacent address. Therefore, rather than performing two separate comparisons in the LDQ 225 using the two stags, the LDQ disables the LSB of the odd stag and performs a single compare on the woken load entries using the single even stag.

In some instances, a store merge to write the cache may occur on an odd boundary. For example, the first store entry may be an odd address such that the directly adjacent entry is an even address. In this case, the system employs compare logic that allows for grouping the odd and even stags by disabling the LSB compare for the next processor cycle if there is an additional drain in that cycle. If there is no drain in that cycle, then the stag that drained in the previous cycle will be added with one and a single stag will be woken in the next cycle which will wake up an even stag. If a double write continuously occurs on back-to-back boundaries that are aligned to an odd store tag, then the processor will continue the delay sequence until an opportunity occurs in the store write sequence to essentially catch up and balance.

Figure 6A:
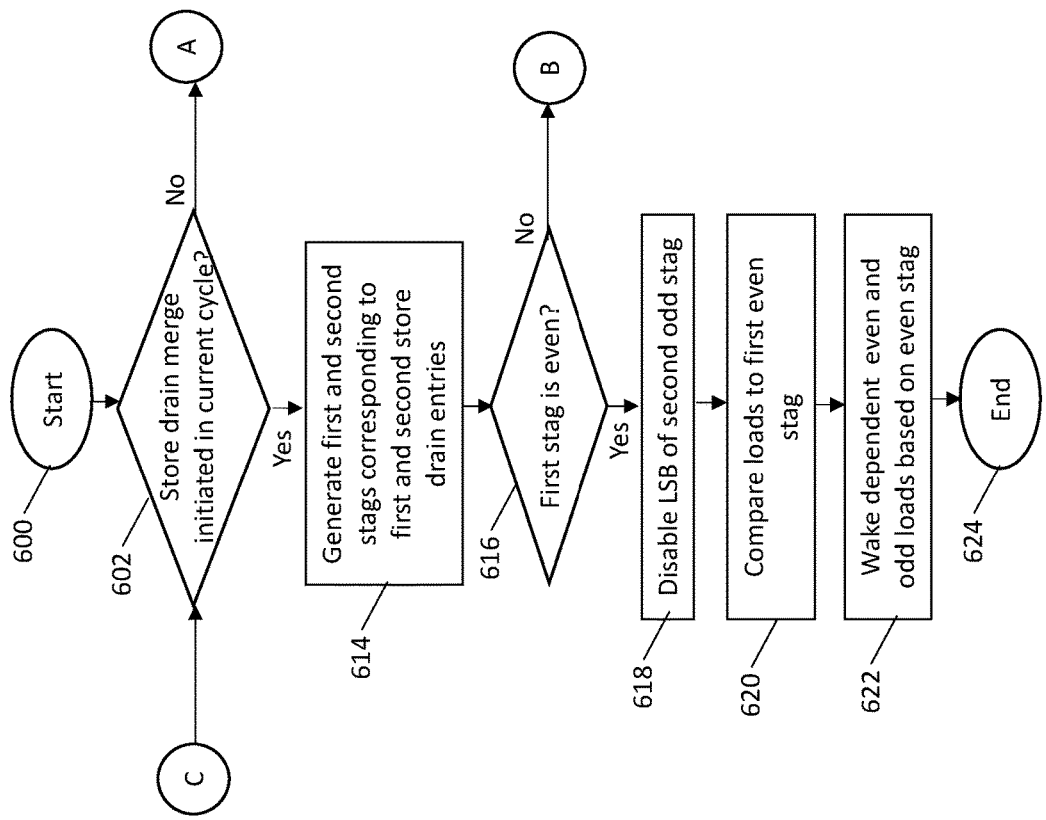
FIGS. 6A, 6B and 6C depict a flow diagram illustrating a method of waking up loads sleeping on dependent store entries according to a non-limiting embodiment.
Figure 6B:
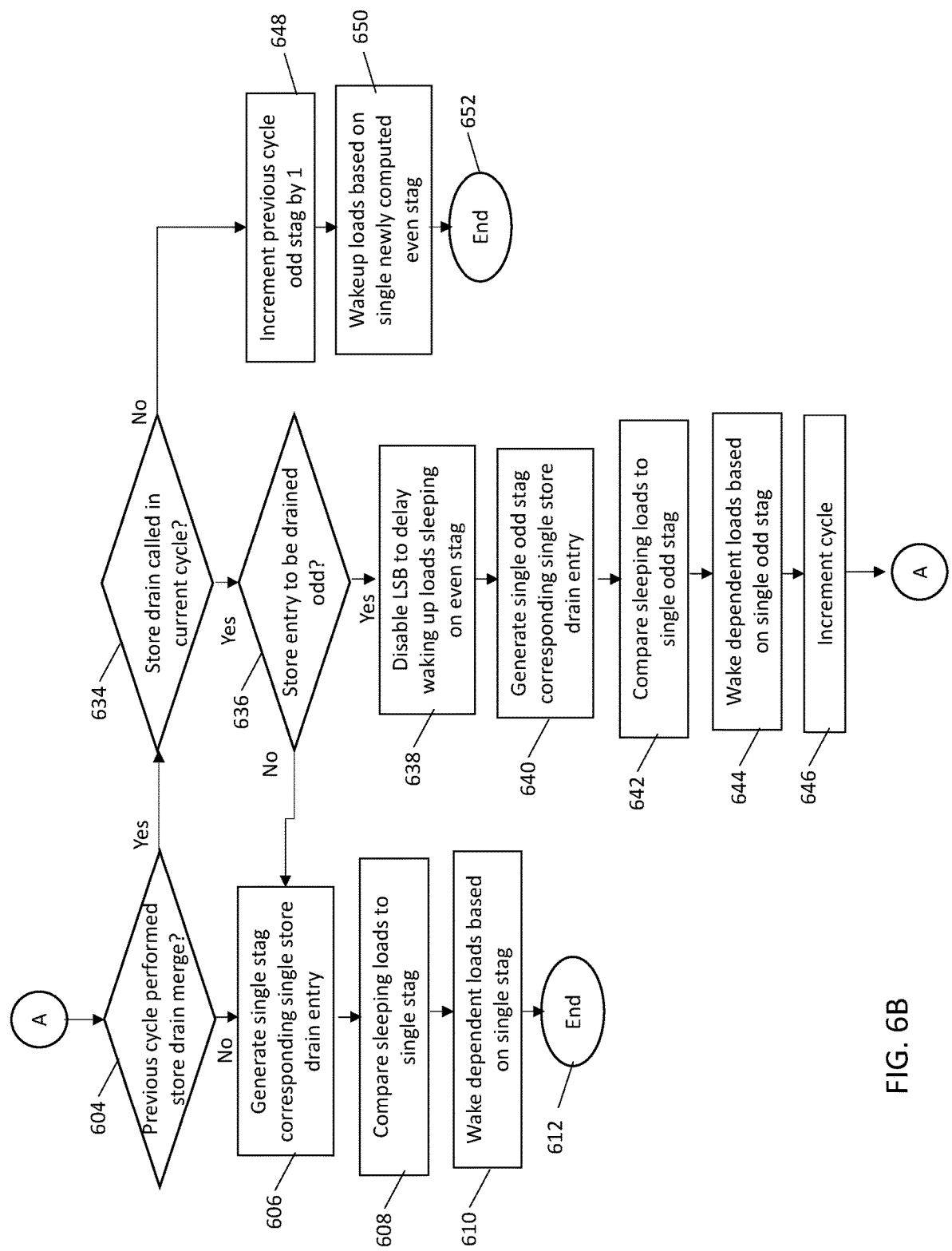
Figure 6C:
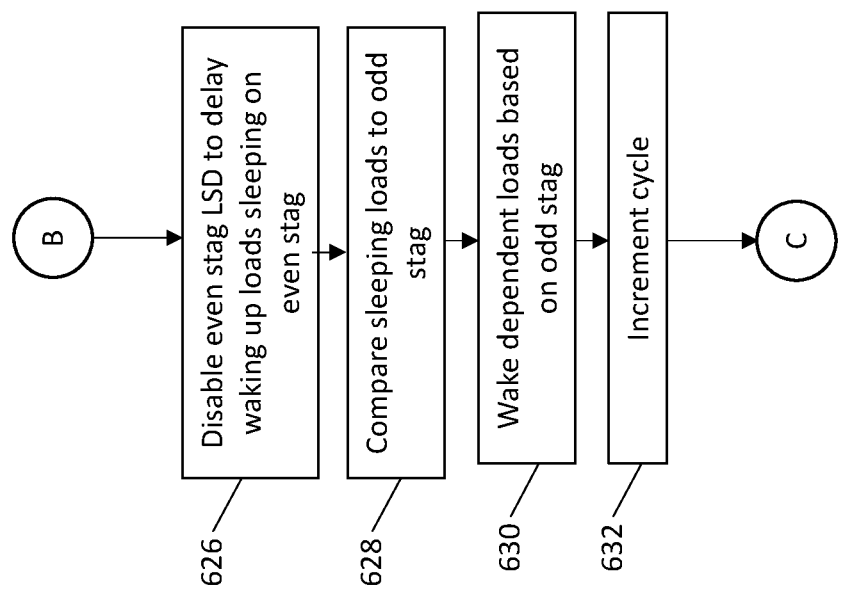

Turning to FIGS. 6A, 6B and 6C, a flow diagram illustrating a compare logic for waking up dependent loads that are sleeping until a corresponding store drain entry writes to cache illustrated according to a non-limiting embodiment. The method begins at operation 600 and at operation 602 a determination is made as to whether a store drain merge is initiated in a current cycle. In this example, the current cycle is initially the first cycle (e.g., cycle "0") among a plurality of sequential cycles (e.g., 0-9). The term "store drain merge" referenced in FIGS. 6A-6C refers to "merging" data stores by writing a pair stores having directly adjacent addresses (e.g., even and odd, or odd and even) to the cache in the same processor cycle. When it is determined that no directly adjacent stores are present following a store data write command, a store drain merge operation will not be invoked at operation 602 and the method proceeds to operation 604 (see FIG. 6B).

At operation 604, a determination is made as to whether the previous cycle performed a store drain merge operation. As mentioned above, the current cycle at this stage in the process flow is the first cycle (i.e., cycle "0"). Therefore, a store drain merge operation was not performed in the previous cycle and the method proceeds to operation 606 to generate a single stag corresponding to the single store drain entry. At operation 608 sleeping loads in the LDQ 225 are compared to the single stag. At operation 610, load entries in the LDQ 225 corresponding to the single stag are woken up and the method ends at operation 612.

Referring back to operation 602 and a store drain merge is initiated in the initial cycle (i.e., a pair of store entries having adjacent addresses exist at cycle 0), the method proceeds to operation 614 and generates a first stag corresponding to the first store entry and a second stag corresponding to the second store entry. At operation 616, a determination is made as to whether the first stag is an even stag (i.e., corresponding to a store entry having an even address) or an odd stag (i.e., corresponding to a store entry having an odd address). When the first stag is an even stag, the system determines that the second stag is an odd stag and disables the LSB on the odd stag at operation 618. At operation 620, sleeping loads in the LDQ 225 are compared to the only the even stag. At operation 622, loads sleeping on both the even stag and the odd stag are woken up based on only the even stag comparison and the method ends at operation 624.

Referring back to operation 616, the store drain merge may occur at an odd boundary, i.e., the first stag may correspond to a store entry having an odd address and the second stag may correspond to a store entry having an even address. Accordingly, the first stag is determined as an odd stag and the method proceeds to operation 626 and disables the LSB of the even stag to delay waking up loads sleeping on the even stag (see FIG. 6C). At operation 628, sleeping loads in the LDQ 225 are compared to only the odd stag, and at operation 630 loads sleeping on the odd stag are woken up based on only the odd stag comparison. At operation 632, the current cycle is incremented and the method returns to operation 602.

With reference again to operation 602, a determination is made as to whether a store drain merge is initiated in the current cycle. At this stage in the process flow, the current cycle is the next cycle in the sequence (e.g., cycle "1"). When a store drain merge is initiated in the current cycle, the method proceeds to operation 614 and repeats the operates described above.

When, however, a store drain merge is not initiated (i.e., no directly adjacent stores entries are available), a store drain merge operation will not be invoked at operation 602 and the method proceeds to operation 604 (see FIG. 6B).

At operation 604, a determination is made as to whether the previous cycle performed a store drain merge operation. Unlike the previous scenario, at this stage in the process flow current cycle, the current cycle has incremented from the initial cycle. When a store drain merge operation was not performed in the previous cycle, the method repeats operations 606-612 described above.

When, however, a drain merge operation was performed in the previous cycle, the method proceeds to operation 634 to determine whether a store drain is called in the current cycle. When a store drain is not called in the current cycle, a "catch up" event is detected, which provides an opportunity to end delaying the wakeup of loads depending on the even store tag. Accordingly, the odd stag from the previous cycle is increment by "1" at operation 648, thereby computing a new even stag. At operation 650, one or more loads in the LDQ 225 are woken up based on the newly computed single even stag, and the method ends at operation 652.

Returning to operation 634, a store drain may be called in the current cycle. Accordingly, the method proceeds to operation 636 to determine whether the store entry to be drained is an odd store entry (i.e., is a store entry having an odd address) or an even store entry (i.e., a store entry having an even address). When the store entry is not an odd entry but is rather an even entry, a "catch up" event is detected, which provides an opportunity to end delaying the wakeup of loads depending on the even store tag. Accordingly, the method repeats operations 606-612 as described above, which ultimately wakes up load entries in the LDQ 225 corresponding to the single stag at operation 612 and ends delaying the wakeup of loads depending on the even store tag.

When, however, the store entry is an odd entry, the system disables the LSB of the corresponding even stag at operation 638 to delay waking up loads in the LDQ 225 sleeping on the even stag. At operation 640, a single odd stag corresponding to the odd store entry to be drained is generated, and at operation 642 sleeping loads in the LDQ 225 are compared to the single odd stag. At operation 644, load entries in the LDQ 225 corresponding to the single odd stag are woken up. At operation 646, the current cycle is incremented and the method returns to operation 602.

Accordingly, the operations associated with the flow diagram illustrated in FIGS. 6A, 6B and 6C provide a mechanism that delays the wakeup of loads depending on the even store tag to the next processor cycle when a call to perform a store drain merge operation occurs on an odd boundary. Whether the LSB compare is disable or the even stag individually is woken up is dependent on how more stores write the cache in the subsequent cycle. This delay wakeup to the next cycle can be continuously performed until the sequence does not observe a double write.

Figure 7:
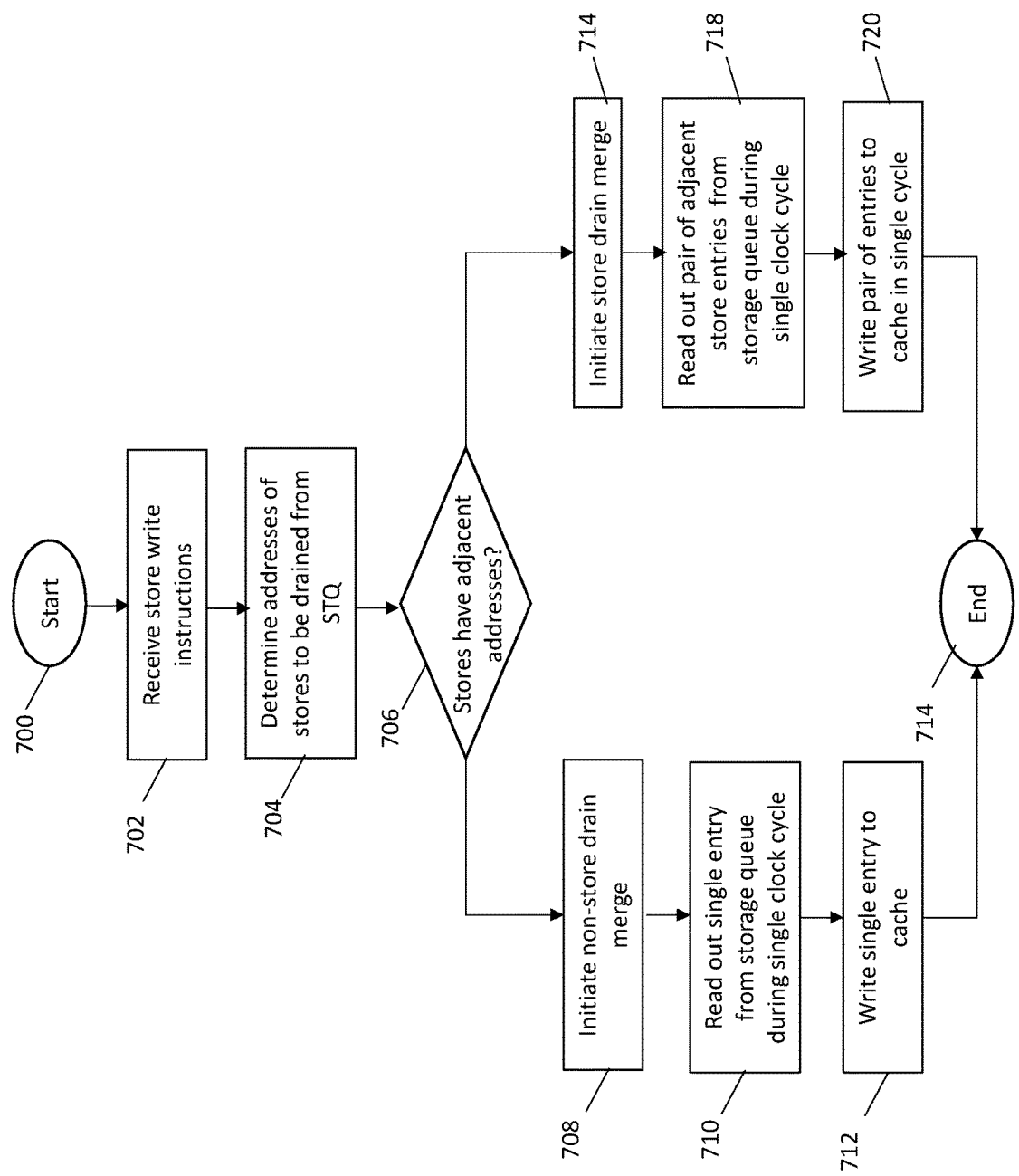
FIG. 7 depicts a flow diagram illustrating a method of performing a store drain merge operation according to a non-limiting embodiment.

With reference now to FIG. 7, a method of performing a store drain merge operation in a computing system is illustrated according to a non-limiting embodiment. The method begins at operation 700, and at operation 702 store write instructions are received. At operation 704, the addresses of the stores to be drained from the STQ are determined. At operation 706, a determination is made as to whether store entries to be drained have adjacent addresses. When there are no adjacent addresses, the computing system initiates a non-store drain merge operation at operation 708. Accordingly, a single entry is read out from the storage queue during a single clock cycle at operation 710. At operation 712, the single drained entry is written to cache and the method ends at operation 714.

When, however, one or more adjacent addresses are detected at operation 706, the computing system initiates a store drain merge operation at operation 716. Accordingly, a pair of adjacent store entries are read out from the storage queue during a single clock cycle at operation 718. At operation 720, the pair of drained entries are written to cache in adjacent memory locations and the method ends at operation 714.

Additional processes also may be included, and it should be understood that the processes depicted in FIG. 7 represent illustrations, and that other processes may be added or existing processes may be removed, modified, or rearranged without departing from the scope and spirit of the present disclosure.

Figure 8:
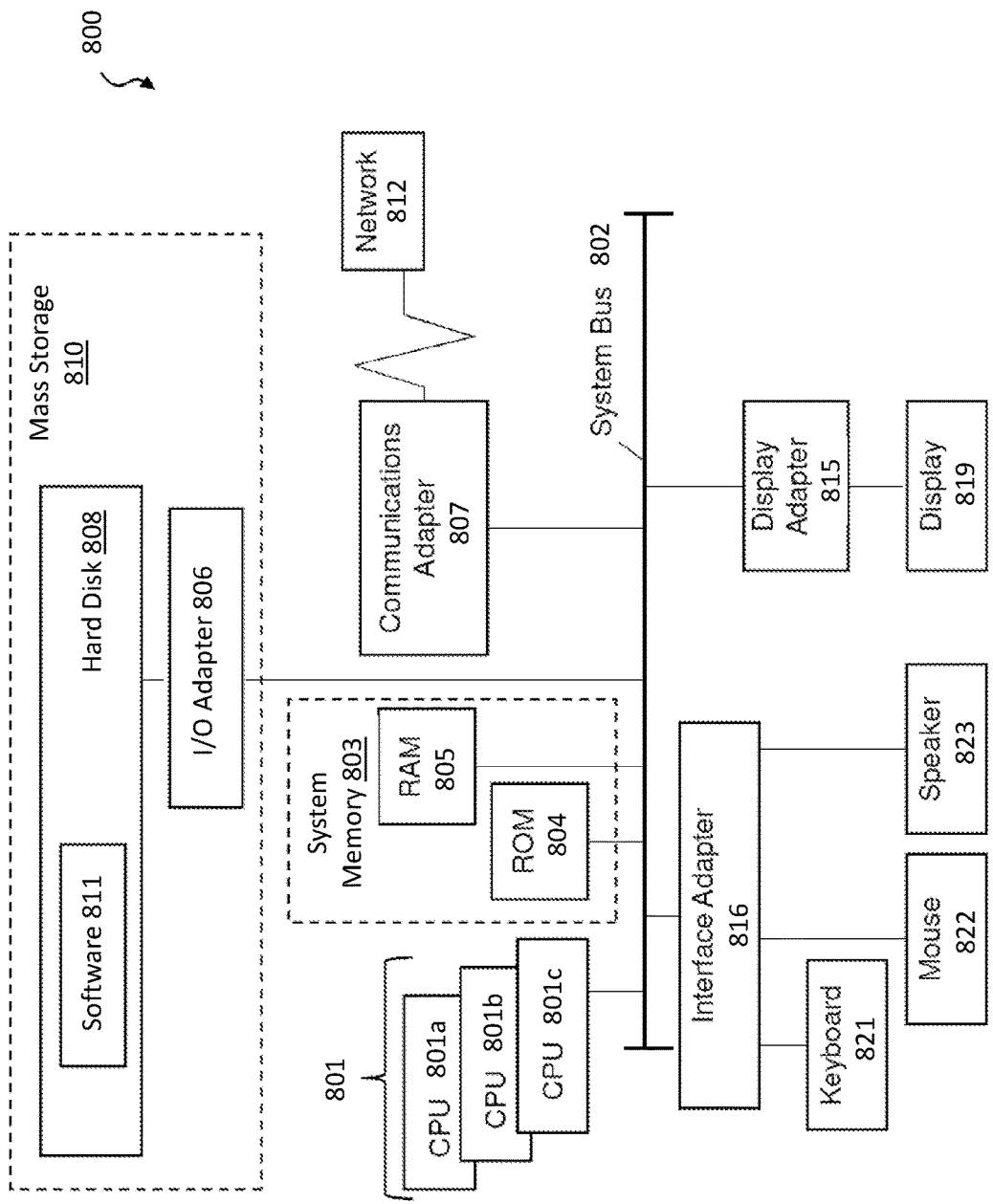
FIG. 8 depicts a block diagram of a computer system for implementing some or all aspects of one or more non-limiting embodiments.

Turning now to FIG. 8, a block diagram of a computer system 800 for implementing some or all aspects of one or more embodiments of the present invention. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 can be, for example, a server, desktop computer, laptop computer, tablet computer, or smartphone. In some examples, computer system 800 can be a cloud computing node. Computer system 800 can be described in the general context of computer system executable instructions, such as program modules, being executed by a computer system. Generally, program modules can include routines, programs, objects, components, logic, data structures, and so on that perform particular tasks or implement particular abstract data types. Computer system 800 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 8, the computer system 800 has one or more central processing units (CPU(s)) 801a, 801b, 801c, etc., (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and can include a basic input/output system (BIOS), which controls certain basic functions of the computer system 800. The RAM 805 is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 can be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 can be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which can be an outside network, enabling the computer system 800 to communicate with other such systems. In one embodiment, a portion of the system memory 803 and the mass storage 810 collectively store an operating system, which can be any appropriate operating system to coordinate the functions of the various components shown in FIG. 8.

Additional input/output devices are shown as connected to the system bus 802 via a display adapter 815 and an interface adapter 816. In one embodiment, the adapters 806, 807, 815, and 816 can be connected to one or more I/O buses that are connected to the system bus 802 via an intermediate bus bridge (not shown). A display 819 (e.g., a screen or a display monitor) is connected to the system bus 802 by the display adapter 815, which can include a graphics controller to improve the performance of graphics intensive applications and a video controller. A keyboard 821, a mouse 822, a speaker 823, etc., can be interconnected to the system bus 802 via the interface adapter 816, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 can be a cellular network, a radio network, a wide area network (WAN), a local area network (LAN), or the Internet, among others. An external computing device can connect to the computer system 800 through the network 812. In some examples, an external computing device can be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for executing a store drain merge operation to wakeup load entries sleeping on dependent store entries, the method comprising:
    detecting, by a processor, a call to perform the store drain merge operation;
    generating a pair of store tags comprising a first store tag corresponding to a first store entry to be drained and a second store tag corresponding to a second store entry to be drained;
    determining the pair of store tags is one of an even-type store tag and an odd-type store tag, the even-type store tag pair including the first store tag as an even store tag and the second store tag as an odd store tag, and the odd-type store tag including the first store tag as an odd store tag and the second store tag as an even store tag;
    in response to determining the even-type store tag pair, disabling the odd store tag included in the even-type store tag pair; and
    waking up a first load entry dependent on the even store tag and a second load entry dependent on the odd store tag based on the even store tag included in the even-type store tag pair while the odd store tag is disabled.

2. The computer-implemented method of claim 1, wherein the first and second load entries are woken in a single given clock cycle of the processor.

3. The computer-implemented method of claim 1, wherein the even and odd store tags are defined as a plurality of bits.

4. The computer-implemented method of claim 3, wherein disabling the odd store tag includes disabling the least significant bit (LSB) of the odd store tag.

5. The computer-implemented method of claim 3, wherein in response to determining the odd-type store tag pair, waking up a first load entry dependent on the odd store tag during a first clock cycle of the processor and delaying wakeup of a second load entry dependent on the even store tag until a subsequent clock cycle following the first clock cycle.

6. The computer-implemented method of claim 5, wherein delaying the wakeup of the second load entry includes disabling the LSB of the even store tag.

7. The computer-implemented method of claim 6, delaying the wakeup of the second load entry until the subsequent clock cycle excludes a call to perform the store drain merge operation.

8. A computer system, comprising:
    a store queue unit configured to hold at least one store entry to be completed;
    a load queue unit configured to hold at least one load entry sleeping on a store entry included in the store queue unit;
    a processor configured to detect a call to perform a store drain merge operation and to generate a pair of store tags comprising a first store tag corresponding to a first store entry to be drained from the store queue unit and a second store tag corresponding to a second store entry to be drained from the store queue unit,
    wherein the processor determines the pair of store tags is one of an even-type store tag and an odd-type store tag, the even-type store tag pair including the first store tag as an even store tag and the second store tag as an odd store tag, and the odd-type store tag including the first store tag as an odd store tag and the second store tag as an even store tag, disables the odd store tag included in the even-type store tag pair in response to determining the even-type store tag pair, and wakes up a first load entry dependent on the even store tag and a second load entry dependent on the odd store tag based on the even store tag included in the even-type store tag pair while the odd store tag is disabled.

9. The computer system of claim 8, wherein the first and second load entries are woken in a single given clock cycle of the processor.

10. The computer system of claim 8, wherein the even and odd store tags are defined as a plurality of bits.

11. The computer system of claim 10, wherein disabling the odd store tag includes disabling the least significant bit (LSB) of the odd store tag.

12. The computer system of claim 10, wherein in response to determining the odd-type store tag pair, waking up a first load entry dependent on the odd store tag during a first clock cycle of the processor and delaying wakeup of a second load entry dependent on the even store tag until a subsequent clock cycle following the first clock cycle.

13. The computer system of claim 12, wherein delaying the wakeup of the second load entry includes disabling the LSB of the even store tag.

14. The load entry of claim 13, delaying the wakeup of the second load entry until the subsequent clock cycle excludes a call to perform the store drain merge operation.

15. A computer program product to control a computer system to execute a store drain merge operation to wakeup load entries sleeping on dependent store entries, the computer program product comprising a computer readable storage medium having program instructions embodied therewith, the program instructions executable by an electronic computer processor to control the processor to perform operations comprising:
  detecting, by the processor, a call to perform the store drain merge operation;
  generating a pair of store tags comprising a first store tag corresponding to a first store entry to be drained and a second store tag corresponding to a second store entry to be drained;
  determining the pair of store tags is one of an even-type store tag and an odd-type store tag, the even-type store tag pair including the first store tag as an even store tag and the second store tag as an odd store tag, and the odd-type store tag including the first store tag as an odd store tag and the second store tag as an even store tag;
  in response to determining the even-type store tag pair, disabling the odd store tag included in the even-type store tag pair; and
  waking up a first load entry dependent on the even store tag and a second load entry dependent on the odd store tag based on the even store tag included in the even-type store tag pair while the odd store tag is disabled.

16. The computer program product of claim 15, wherein the first and second load entries are woken in a single given clock cycle of the processor.

17. The computer program product of claim 15, wherein the even and odd store tags are defined as a plurality of bits.

18. The computer program product of claim 17, wherein disabling the odd store tag includes disabling the least significant bit (LSB) of the odd store tag.

19. The computer program product of claim 17, wherein in response to determining the odd-type store tag pair, waking up a first load entry dependent on the odd store tag during a first clock cycle of the processor and delaying wakeup of a second load entry dependent on the even store tag until a subsequent clock cycle following the first clock cycle.

20. The computer program product of claim 19, wherein delaying the wakeup of the second load entry includes disabling the LSB of the even store tag until the subsequent clock cycle excludes a call to perform the store drain merge operation.

* * * * *